Patented Mar. 20, 1934

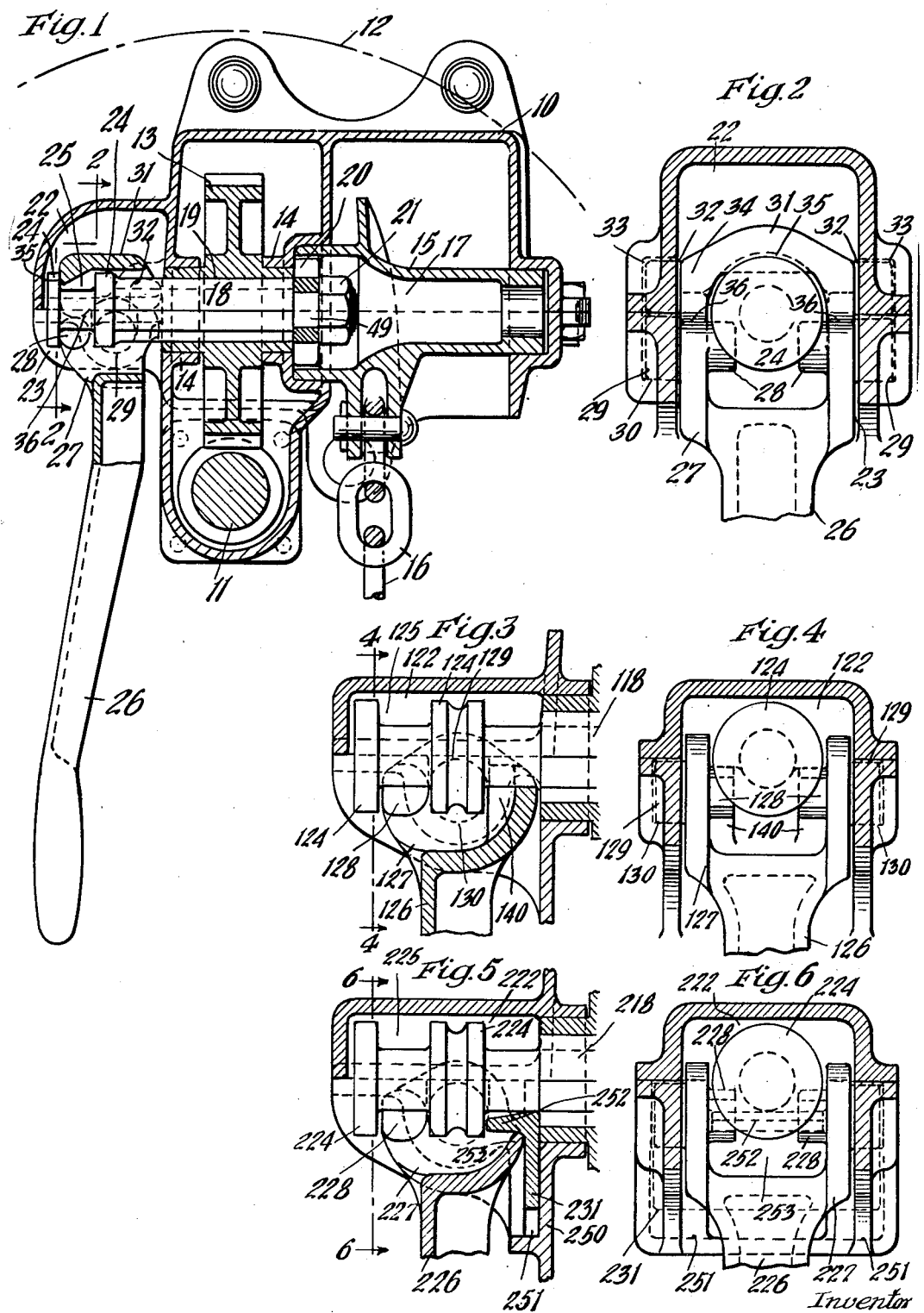

1,951,479

UNITED STATES PATENT OFFICE 1,951,479

CLUTCH OPERATING MECHANISM

Stacy B. Haseltine, Chicago, Ill., assignor to W. H. Miner, Inc., Chicago, Ill., a corporation of Delaware Application October 29, 1931, Serial No. 571,772

10 Claims. (Cl. 192—82)

This invention relates to improvements in clutch operating mechanisms.

The principal object of the invention is to provide a simple and efficient clutch operating mechanism which is automatically locked in clutch engaging position so that accidental disengagement of the clutch is prevented.

Another and more specific object of the invention is to provide a lever mechanism for shifting a clutch member, wherein the lever mechanism is locked in position by means automatically controlled by the lever to hold the clutch engaged.

Other objects of the invention will more clearly appear from the description and claims hereinafter following.

In the drawing, forming a part of this specification, Figure 1 is a vertical sectional view through a hand brake mechanism and driving clutch means thereof especially adapted for railway cars, illustrating my improvements in connection therewith. Figure 2 is a vertical sectional view, on an enlarged scale, corresponding substantially to the line 2—2 of Figure 1, the clutch operating lever being broken away in this view. Figure 3 is a view similar to Figure 1, showing only the left-hand portion of the housing of the brake mechanism and the associated parts of the brake, and illustrating another embodiment of the invention. Figure 4 is a transverse, vertical sectional view, corresponding substantially to the line 4—4 of Figure 3. Figure 5 is a view similar to Figure 3, illustrating still another embodiment of the invention. And Figure 6 is a transverse, vertical sectional view, corresponding substantially to the line 6—6 of Figure 5.

In said drawing, referring first to the embodiment of the invention illustrated in Figures 1 and 2, 10 indicates the housing of a hand brake mechanism, which housing is secured to the end wall of a railway car. The brake mechanism in connection with which my improved clutch operating means is employed is, as shown, of the worm and worm wheel power-multiplying type. The worm of the hand brake is indicated by 11 and is rotated by the usual hand wheel, indicated in dotted lines and designated by the character 12. The worm 11 is in driving engagement with a worm gear 13 rotatable about a horizontal axis and having the hub sections thereof journaled in bearing members 14—14 provided in the housing 10. The chain-winding drum of the brake mechanism is indicated by 15 and is rotatable about an axis coincident with the axis of the worm wheel 13. The drum has the usual chain-winding section, and the brake chain 16 is connected thereto in the usual manner, and in tightening the brakes is wound on the drum. The drum is hollow, as indicated at 17, to accommodate the sliding member of the clutch means for longitudinal movement.

In carrying out my invention, I provide a sliding clutch member 18, which has a stem or shank of angular cross-section slidingly supported in the opening 19 of the hub section of the worm wheel 13. At the inner end, the clutch member projects into the hollow section 17 of the chain-winding drum, said projecting portion being of reduced size and of square cross-section, as indicated at 49. A disc 20, having clutch projections, is mounted on the section 49 of the clutch member and is held in position by means of a nut 21 on the outer end of said member. As will be understood, the interior portion of the corresponding end of the chain-winding drum 15 is provided with cooperating clutch projections which are adapted to interlock with the clutch disc 20 so as to cause the chain-winding drum 15 to rotate with the worm wheel 13 when desired. To disengage the clutch member from the chain-winding drum, the former is shifted to the right, as viewed in Figure 1, thereby unlocking the clutch projections of the disc 20 from the corresponding projections of the drum. The opening in the chain-winding drum to the right of that portion carrying the clutch projections is of such a size as to permit free rotation of the drum with respect to the clutch member when the latter has been shifted to the right, as hereinbefore pointed out. At the left-hand end, the clutch member projects outwardly of the hub of the worm wheel 13 and is housed within an additional chamber 22 of the housing. This chamber is open at the bottom, as indicated at 23, to accommodate the lever by which the clutch is shifted. At the outer end, the shank of the clutch member 18 is provided with a pair of spaced annular flanges 24—24 defining an annular guide groove 25 therebetween.

The operating lever, which is indicated by 26, has a handle section at the outer end thereof and an enlarged headlike portion 27 at the inner end. The headlike portion 27 is forked and has a pair of inwardly projecting aligned trunnions 28—28 on the members of the forked section engaging within the annular groove 25 of the clutch member 18. On the outer side at opposite sides thereof, the head of the lever 26 is provided with a pair of aligned pivot trunnions 29—29 journaled in bearing seats 30—30 provided on opposite side walls of the housing chamber 22. As will be evident, inasmuch as the trunnions 28—28 are eccentric to the pivot trunnions 29—29 of the lever 26, the clutch member 18 will be shifted to the right when the lever 26 is swung upwardly and to the left, as viewed in Figure 1. In this connection, it is pointed out that the trunnions 28—28 are so located with reference to the trunnions 29—29 that during the first part of the outward and upward swinging movement of the lever 26, the trunnions 28—28 will travel upwardly in the guide groove 25 of the clutch member without effecting immediate shifting of said clutch member. In this connection, it is further pointed out that a slight amount of clearance is provided between the trunnions 28—28 and the side walls of the groove 25 provided by the flanges 24—24. In the position shown in Figure 1 where the clutch lever is pendent, the clutch is in engaged position and the gear 13 in driving relation with the chain-winding drum 15. In order to prevent accidental shifting of the clutch member, a latch element 31 is employed. This latch element is in the form of a yokelike member overhanging the upper portion of the outer end of the sliding clutch member and has a pair of aligned trunnions 32—32 at the inner end thereof journaled in bearings 33—33 in the side walls of the housing chamber 22 to swingingly support said latch member. At the outer end, the latch member is forked, as indicated at 34, the members of said forked section being connected by a web section having a flat outer end face 35 adapted to abut the inner side of the outer flange 24 of the clutch member. The forked portions of the latch 31 are extended downwardly and have curved bottom edges 36—36 which normally rest on the upper ends of the members of the fork of the operating lever 26. As shown in Figure 1, engagement of the lever 26 with the pivoted latch 31 is substantially at the point where the trunnions 28—28 of the lever are located, the engagement provided being of a camlike nature. As will be evident, when the lever 26 is swung outwardly and to the left, as hereinbefore described, to effect disengagement of the clutch member from the clutch element provided by the chain-winding drum, the trunnions 28—28 at the beginning of the movement of the lever 26 are guided between the flanges 24—24 of the clutch member 18 without effecting shifting of said clutch member. Inasmuch as the lever head is in engagement with the latch 31, the latter will be lifted during this initial movement. When the latch has been lifted a sufficient distance for the abutment face 35 to clear the outer flange 24 of the clutch member, the clutch member will be free to be shifted, and the trunnions 28—28 will then engage the inner flange 24 of the clutch member and force the same to the right, as viewed in Figure 1, thereby causing disengagement of said clutch member. When the operating lever 26 is permitted to drop to its pendent position through the action of gravity, the clutch will be returned to locking engagement with the chain-winding drum through engagement of the trunnions 28—28 with the outer flange 24 of the clutch member, and the latch 31 will drop by gravity into the groove 25 of the clutch member as the head of the lever 26 recedes, thus again locking the clutch in engaged position.

Referring next to the embodiment of the invention illustrated in Figures 3 and 4, the general construction is substantially the same as that described in Figures 1 and 2. The sliding clutch member is indicated by 118 and the operating lever by 126. The clutch 118 has the outer end thereof housed within a chamber 122 of the housing, similar to chamber 22 hereinbefore described. This chamber is open at the bottom so as to accommodate the actuating lever for swinging movement. At the outer end, the clutch member 118 is provided with spaced annular flanges 124—124 defining a guide groove 125 therebetween. The operating lever is pivotally supported in the housing chamber 122 and has a headed upper end portion 127, which is forked and provided with aligned trunnions 128—128 on the inner side thereof, engaging within the groove 125 of the clutch member 118, the trunnions having slightly flattened bearing faces on the outer side thereof and the groove 125 being of slightly greater width than that of the trunnions 128—128. On the outer side, the head is provided with aligned trunnions 129—129 on opposite sides thereof, which are journaled in bearing seats 130—130 provided in the side walls of the housing. The trunnions 129—129 normally lie in horizontal alignment with the trunnions 128—128, thus tending to prevent accidental shifting of the clutch member. The parts of the mechanism thus far described in connection with Figures 3 and 4 are substantially the same as the corresponding parts described in connection with Figures 1 and 2. In order to provide additional locking engagement of the clutch member 118 with the cooperating clutch element of the chain-winding drum of the brake mechanism, the forked head 127 of the lever is provided with webs or lugs 140—140 on opposite sides thereof, which in the pendent position of the lever are adapted to have shouldered engagement with the inner side of the right-hand annular flange 124 of the clutch member 118, as viewed in Figure 3. As will be clear, when the lever 126 is in pendent position, the shouldered engagement of the projections or lugs 140—140 with the adjacent annular flange 124 of the clutch member 118 will prevent shifting to the right of said clutch member, as viewed in Figure 3, and lock the same engaged with the cooperating clutch element of the chain-winding drum. The operation in disengaging the clutch is the same as that hereinbefore described in connection with Figures 1 and 2. Due to the clearance between the trunnions 128—128 and the walls of the groove 125, the lever 126, when moved to the left and lifted, will first cause the shoulders of the lugs 140—140 to clear the cooperating annular flange 124 and then the trunnions 128—128 will effect movement to the right of the clutch member 118 so as to disengage the same. When the lever is again dropped to the pendent position, the clutch will be returned and the lugs 140—140 brought into position to have shouldered engagement with the cooperating annular flange 124 of the sliding clutch member.

Referring next to the embodiment of the invention illustrated in Figures 5 and 6, the clutch member is indicated by 218 and has the outer end thereof disposed within the housing chamber 222. The clutch stem is provided with spaced annular flanges 224—224 defining a groove 225 therebetween. The operating lever, which is indicated by 226, has a forked upper end 227, which has aligned interior trunnion projections 228—228 engaging within the annular groove 225 of the clutch member. The parts thus far described in connection with Figures 5 and 6 are substantially the same as the corresponding parts illustrated in Figures 3 and 4, and operate in a similar manner.

When the lever 226 is moved to the left and lifted, the clutch member 218 will be shifted to the right by means of the trunnions 228—228 engaging between the flanges 224—224, thus disengaging the clutch 218 from the cooperating clutch element of the chain-winding drum. In order to prevent accidental disengagement of the clutch member, a sliding latch 231 is employed. This latch is guided between the right-hand flange 224 of the clutch member 218 and the inner wall 250 of the housing section 222. The sliding latch 231 preferably comprises a plate-like section working in guide grooves 251—251 and a lateral extension or flange 252 at the upper end thereof normally disposed between the wall 250 and the adjacent annular flange 224. The clutch member will thus be locked against shifting movement to the right, unless the latch 231 is withdrawn. The forked section of the clutch operating lever 226 has a web 253, which has shouldered engagement at the upper end thereof with the projection 252 of the latch 231, thereby supporting the same in the position shown in Figure 5. As will be evident, when the lever 226 is swung to the left and upwardly in shifting the clutch member 218, the web 253 recedes, thereby permitting the latch 231 to drop so as to clear the innermost flange 224 of the clutch member 218. This unlatching takes place during the initial movement of the trunnions 228—228 in the groove 225, during which time there is no shifting of the clutch member. After the latch 231 has been disengaged, the clutch 218 is shifted to the right by the lever 226, as hereinbefore pointed out, thereby disengaging the clutch member from the cooperating clutch element of the chain-winding drum. When the lever 226 is brought back to the pendent position shown in Figure 5, the web 253, through engagement with the sliding latch member 231, will restore the latter to the locking position shown in Figure 5.

I have herein shown and described what I now consider the preferred manner of carrying out my invention, but the same is merely illustrative and I contemplate all changes and modifications that come within the scope of the claims appended hereto.

I claim:

1. In a mechanism of the character described, the combination with a relatively fixed rotary clutch element and a rotary sliding clutch member, said element and member having cooperating clutch means thereon; of a pivoted lever for shifting said clutch member with respect to said element, said lever having an eccentric lug member having shouldered engagement with the clutch member to shift the latter; and latch means having shouldered engagement with said clutch member to hold the same engaged with said clutch element, said latch means being actuated by movement of the lever and completely disengaged from the clutch member when the lever is swung to release said clutch member.

2. In a mechanism of the character described, the combination with a relatively fixed rotary clutch element and a relatively slidable rotary clutch member, said element and member having interengaging clutch means thereon, said clutch member having a section provided with an annular groove; of a pivoted actuating lever having trunnions eccentric to the pivot thereof, said trunnions being engaged within said groove of the clutch member to shift the same; a pivoted latch member having shouldered engagement with the clutch member to lock the latter engaged with said clutch element; and eccentric means on said lever for unlocking said latch member from said clutch member when the lever is moved in a direction to disengage the clutch member.

3. In a mechanism of the character described, the combination with a relatively fixed rotary clutch element and a relatively slidable rotary clutch member, said element and member having interengaging clutch means thereon, said clutch member having a section provided with an annular groove; of a pivoted actuating lever having trunnions eccentric to the pivot thereof, said trunnions being engaged within said groove of the clutch member to shift the same; a pivoted latch member having a projection engageable within said groove of said clutch member to hold the clutch member engaged with said clutch element; and cam means on said lever engaging said projection of the latch member to lift the latch member out of the groove of the clutch member when said lever is swung in a direction to disengage the clutch member from the clutch element.

4. In a mechanism of the character described, the combination with a relatively fixed rotary clutch element and a rotary sliding clutch member, said element and member having cooperating clutch means thereon, said clutch member having an annular radial shoulder; of a pivoted lever for shifting said clutch member with respect to said element, said lever having an eccentric lug member having shouldered engagement with the clutch member to shift the latter; and a rigid projection on said lever engageable in back of said radial shoulder of said clutch member when the clutch member is engaged with the clutch element, said projection being completely withdrawn from shouldered engagement when the lever is swung to disengage the clutch member from said clutch element.

5. In a mechanism of the character described, the combination with a relatively fixed rotary clutch element and a relatively slidable rotary clutch member, said element and member having interengaging clutch means thereon, and said member having a section thereof provided with spaced, fixed annular flanges defining an annular groove therebetween; of a pivoted actuating lever having trunnions eccentric to the pivot thereof, said trunnions being engaged within said groove of said clutch member to shift the latter when the lever is swung on its pivot; and a fixed latch projection on said lever having shouldered engagement with one of said annular flanges of the clutch member to lock said clutch member engaged with the clutch element.

6. In a mechanism of the character described, the combination with a relatively fixed rotary clutch element and a relatively slidable rotary clutch member, said element and member having interengaging clutch means thereon, said clutch member having a section provided with an annular groove; of a pivoted actuating lever having trunnions eccentric to the pivot thereof, said trunnions being engaged within said groove of the clutch member to shift the same; a sliding latch member having shouldered engagement with said clutch member to lock the clutch member engaged with said element; and means on said lever having shouldered engagement with said sliding latch member for holding the same engaged with the clutch member when the lever is in clutching position.

7. In a mechanism of the character described, the combination with a relatively fixed rotary clutch element and a relatively slidable rotary clutch member, said element and member having interengaging clutch means thereon, and said member having a section thereof provided with spaced, fixed annular flanges defining an annular groove therebetween; of a pivoted actuating lever having trunnions eccentric to the pivot thereof, said trunnions being engaged within said groove of said clutch member to shift the latter when the lever is swung on its pivot; a gravity influenced vertically slidable latch member having shouldered engagement with one of said annular flanges of the clutch member to lock said clutch member in engaged relation with said clutch element; and eccentric means on said lever having shouldered engagement with the latch to hold the same in locking position when said lever is in position to hold said clutch member engaged with the clutch element.

8. In a mechanism of the character described, the combination with a relatively fixed rotary clutch element and a relatively slidable rotary clutch member, said element and member having interengaging clutch means thereon, and said member having a section thereof provided with spaced, fixed annular flanges defining an annular groove therebetween; of a pivoted actuating lever having trunnions eccentric to the pivot thereof, said trunnions being engaged within said groove of said clutch member to shift the latter when the lever is swung on its pivot; a gravity influenced vertically slidable latch member having shouldered engagement with one of said annular flanges of the clutch member to lock said clutch member in engaged relation with said clutch element; and eccentric means on said lever having shouldered engagement with the latch to lift the same to locking position when said lever is swung to engage the clutch member with the clutch element, said shouldered engagement of the lever with the latch also holding the latch in locking position when the lever is in position to hold the clutch member engaged with the clutch element.

9. In a mechanism of the character described, the combination with a rotary clutch element; of a horizontally slidable rotary clutch member movable toward and away from said element, said element and member having cooperating clutch means thereon, said slidable clutch member having an annular groove therein defined by spaced walls; and a lever for reciprocating said clutch member, said lever being pivoted at one end and having a lug eccentric to the pivot thereof engaging within the groove of said member, said lug engaging one of said walls to move said clutch member away from said clutch element when the lever is swung in one direction, said lug engaging the opposed wall of said groove to move said clutch member toward said element when the lever is swung in a reverse direction, said lug having the contacting surface portion thereof with said last named wall lying in a horizontal line radial to the pivot of the lever when the clutch member is engaged with said said clutch element, the surface of said lug being so formed that the surface portion of said lug adjacent to said point of contact and above said horizontal line is disposed closer to said pivot than said contacting portion, said lever being further swingable to a predetermined extent in said last named direction to displace said contacting surface portion beyond said line, thereby bringing said adjacent surface portion of the lug in opposed relation to said last named wall and preventing accidental disengagement of said clutch member and clutch element.

10. In a mechanism of the character described, the combination with a rotary clutch element; of a rotary clutch member axially slidable toward and away from said element, said member and element having cooperating clutch means thereon, said member having an annular groove defined by spaced walls; and a lever pivoted for operating said clutch member, said lever having a lug eccentric to the pivot thereof engaging within said groove, said lug engaging one wall of said groove to move said clutch member toward said element and into enagement therewith when the lever is swung in one direction, said lug having the surface portion thereof, which contacts with the last named wall, lying in a line radial to the pivot of the lever and substantially parallel to the axis of said member when said member and element are completely engaged, the contour of the surface of said lug adjacent to said contacting portion being such that said adjacent surface portions are disposed closer to said pivot than said contacting portion, said lever being swingable in said direction to a predetermined extent beyond the clutch-engaging position thereof to displace said contacting surface portion beyond said line, which is radial to the pivot and parallel to the direction of sliding movement of the clutch member, thereby bringing said adjacent surface portion, which is to the rear of said contacting surface portion, in opposed relation to said last named wall and preventing accidental disengagement of the clutch member and clutch element.

STACY B. HASELTINE.